(12) United States Patent
Bhatmurge et al.

(10) Patent No.: US 12,450,637 B2
(45) Date of Patent: Oct. 21, 2025

(54) AUTOMATIC ENTITY CREATION FOR USE IN KEYWORD FILTER OF ITEM REVIEWS

(71) Applicant: Target Brands, Inc., Minneapolis, MN (US)

(72) Inventors: Mayur Bhatmurge, Karnataka (IN); Steffie Rodrigues, Karnataka (IN); Kunal Kaul, Karnataka (IN); Anand Chowdhury, Karnataka (IN); Manohar Sripada, Karnataka (IN); Darshna Ramamurthy, Karnataka (IN); Sreedevi Kothandaraman, Karnataka (IN); Vishal Vaibhav, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 200 days.

(21) Appl. No.: 17/851,000

(22) Filed: Jun. 27, 2022

(65) Prior Publication Data

US 2023/0419373 A1    Dec. 28, 2023

(51) Int. Cl.
*G06Q 30/0282*    (2023.01)
(52) U.S. Cl.
CPC .............................. *G06Q 30/0282* (2013.01)
(58) Field of Classification Search
None
See application file for complete search history.

(56) References Cited

U.S. PATENT DOCUMENTS

| | | | |
|---|---|---|---|
| 8,515,828 B1 * | 8/2013 | Wolf | G06Q 30/02 |
| | | | 705/26.7 |
| 9,652,799 B2 | 5/2017 | Boston et al. | |
| 10,007,936 B1 * | 6/2018 | Ghoshal | G06Q 50/01 |
| 10,242,019 B1 | 3/2019 | Shan et al. | |
| 10,515,140 B1 * | 12/2019 | Scott | G06F 3/048 |
| 10,748,164 B2 | 8/2020 | Clark et al. | |
| 11,443,180 B1 * | 9/2022 | Boteanu | G06Q 30/0631 |
| 11,488,223 B1 * | 11/2022 | Suprasadachandran Pillai | |
| | | | G06Q 30/0282 |
| 2005/0091038 A1 | 4/2005 | Yi et al. | |
| 2005/0125216 A1 | 6/2005 | Chitrapura et al. | |
| 2014/0172744 A1 * | 6/2014 | El-Hmayssi | G06Q 50/01 |
| | | | 705/347 |

(Continued)

OTHER PUBLICATIONS

Ruck, Lior Goren, "How Customer Reviews Can Be Used for Opinion Mining," Yotpo. [online], archived on Jan. 27, 2021, available at: < https://web.archive.org/web/20210127192021/https://www.yotpo.com/blog/opinion-mining/ > (Year: 2021).*

(Continued)

*Primary Examiner* — Richard W. Crandall
(74) *Attorney, Agent, or Firm* — Merchant & Gould P.C.

(57) ABSTRACT

This disclosure relates to automatic creation and display of keyword filters useable to filter product reviews on an e-commerce website. One aspect is a method for generating entities for filtering item reviews, the method comprising extracting attributes for an item associated with a set of item reviews, generating a list of entities relevant to the item based on the set of item reviews and the extracted attributes for the item, ranking the list of entities based on a frequency of terms related to each entity in the set of item reviews, selecting at least one entity from the list of entities based on the ranking, and associating the at least one entity with the item.

18 Claims, 11 Drawing Sheets

(56) References Cited

U.S. PATENT DOCUMENTS

| | | | | |
|---|---|---|---|---|
| 2016/0019621 A1* | 1/2016 | Jnagal | ................ | G06Q 30/0625 |
| | | | | 705/26.62 |
| 2018/0341961 A1* | 11/2018 | Carricarte | ............... | H04W 4/21 |
| 2020/0020000 A1* | 1/2020 | Guy | ................... | G06Q 30/0282 |
| 2021/0133848 A1* | 5/2021 | Ghorbani | ............... | G06Q 50/01 |

OTHER PUBLICATIONS

Joung, Junegak, Automated Keyword Filtering in Latent Dirichlet Allocation for Identifying Product Attributes from Online Reviews, Journal of Mechanical Design, Dated: Aug. 2021, vol. 143; 6 Pages.
Review Search and Filtering—(Ratings & Reviews—Review Display)—Web Article (Date Printed—Nov. 2021), 2 Pages.
Meldner, Richard, Seller 365, Amazon Introduces New Keywords Filter in Reviews, Aug. 8, 2017, 7 Pages.

\* cited by examiner

900

```
┌─────────────────────────────────────────────────────────────┐
│   Segment guests into a first group and a second group      │
│                           902                               │
└─────────────────────────────────────────────────────────────┘
                              │
┌─────────────────────────────────────────────────────────────┐
│ Provide a review filter on a first set of entities to the   │
│ first group of users and a second set of entities to the    │
│                  second group of users                      │
│                           904                               │
└─────────────────────────────────────────────────────────────┘
                              │
┌─────────────────────────────────────────────────────────────┐
│ Record the selections of the review filter for the first    │
│         group of users and the second group of users        │
│                           906                               │
└─────────────────────────────────────────────────────────────┘
                              │
┌─────────────────────────────────────────────────────────────┐
│  Update the ranked list of entities based on the recorded   │
│                        selections                           │
│                           908                               │
└─────────────────────────────────────────────────────────────┘
```

FIG. 9

AUTOMATIC ENTITY CREATION FOR USE IN KEYWORD FILTER OF ITEM REVIEWS

BACKGROUND

E-commerce websites often include filters to search a catalog of items sold via the e-commerce website. For example, a customer may have the option to filter items by color, size, type, etc. Some e-commerce websites include customer reviews. Customer reviews can include numerical reviews (e.g., a number of stars) and descriptive text describing the customer's review of the item. These reviews can help customers make better purchasing decisions. Some e-commerce websites allow customers to filter based on numerical reviews. For example, a customer may be able to filter items with more than four stars.

Similarly, some e-commerce websites allows customers to filter reviews for an item. For example, an ecommerce website may allow a customer to filter reviews based on a numerical rating. For example, a user can filter the reviews to view only five star reviews. Some existing e-commerce websites also allow a user to filter or sort reviews based on a date the review was posted.

SUMMARY

In general, this disclosure relates to automatic creation and display of keyword filters useable to filter product reviews on an e-commerce website.

One aspect is a method for generating entities for filtering item reviews, the method comprising extracting attributes for an item associated with a set of item reviews, generating a list of entities relevant to the item based on the set of item reviews and the extracted attributes for the item, ranking the list of entities based on a frequency of terms related to each entity in the set of item reviews, selecting at least one entity from the list of entities based on the ranking, and associating the at least one entity with the item.

Another aspect is an e-commerce system comprising, an items database, a review database, at least one processor, at least one memory device storing instructions which, when executed by the at least one processor, cause the e-commerce system to retrieve item data for a plurality of items from the item database, extract attributes for each of the plurality of items based on the item data, for each item of the plurality of items, retrieve one or more item reviews associated with the item from the review database, for each item review of the one or more item reviews, generate a list of entities relevant to the item review based on the item review and the extracted attributes for the item, rank the list of entities based on a frequency of terms related to each entity in the one or more item reviews, select at least one entity from the list of entities based on the ranking, and associate the at least one entity with the item.

BRIEF DESCRIPTION OF THE DRAWINGS

FIG. 9 illustrates an example method for testing entities with guests, in accordance with some embodiments of the present disclosure.

DETAILED DESCRIPTION

Figure 1:
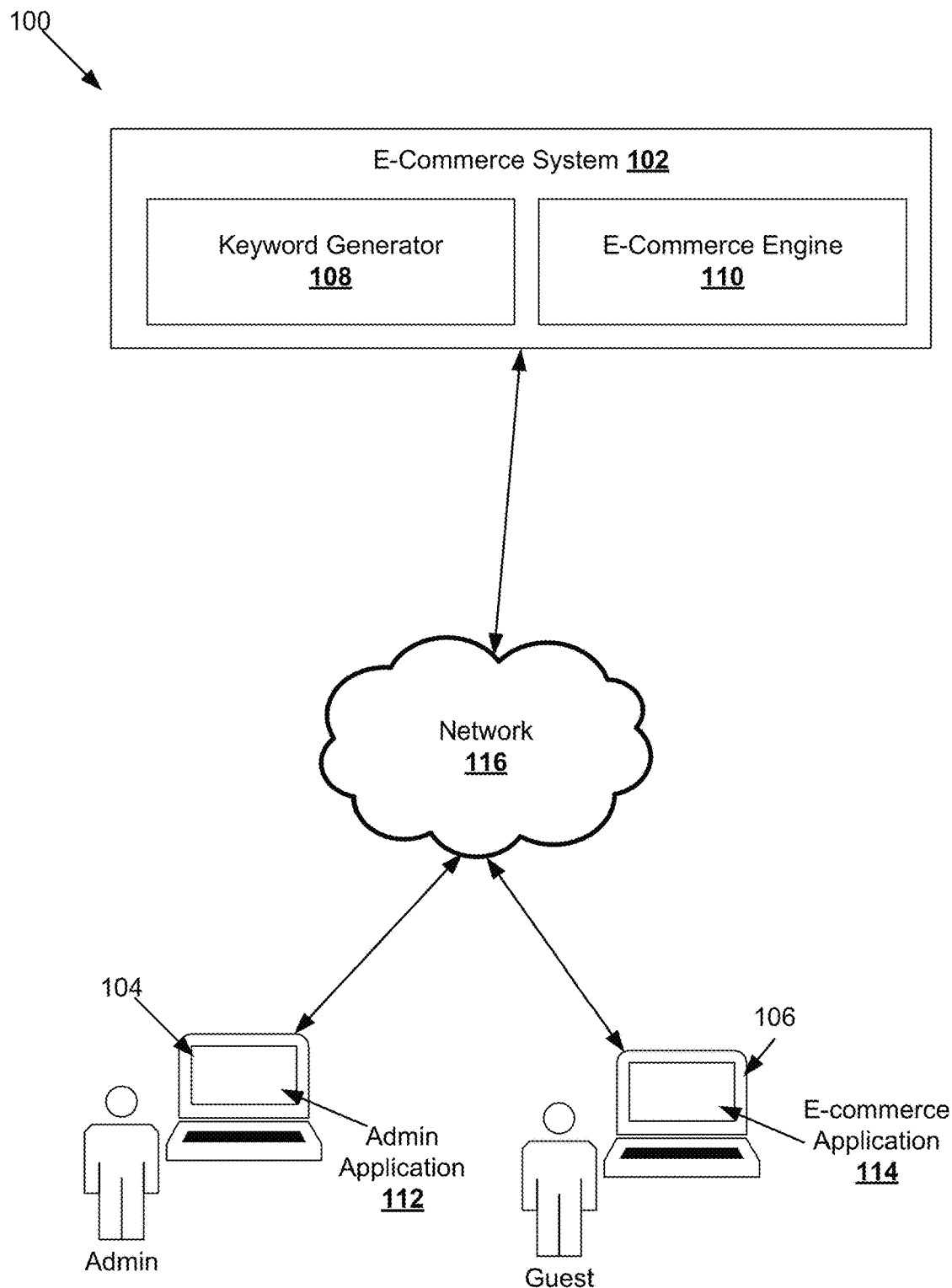
FIG. 1 illustrates an example e-commerce environment for presenting an item with item reviews and keyword filters useable to filter the item reviews, in accordance with some embodiments of the present disclosure.

As briefly described above, embodiments of the present disclosure are directed to automatic creation and display of keyword filters useable to filter product reviews on an e-commerce website.

In some embodiments, the generated keyword filters appear on an item page of an e-commerce website and allow users to filter user reviews by particular keyword entities. For example keyword entities for clothing could include size, color, fit, length, etc. An item ID associated with an item will have a list of possible extracted entities that could be included in a review. These reviews can be filtered by whether the review includes a reference to a particular entity.

In some embodiments, an item attribute generator generates a set of attributes based on item data. In some embodiments, the attributes are common at a division or merchandise type level. Item reviews are passed to an entity matcher and an entity ranker. The entity matcher, which receives both the reviews and the extracted attributes, will generate a list of entities that are relevant to an item and/or each review of the item. The list of entities are passed to the entity ranker, which then ranks the particular entities that are relevant to the review.

In one example, an entity matcher builds entity lists at the item ID level. An entity ingester runs periodically (e.g., hourly, daily, monthly, etc.), and collects outputs from an entity ranker that builds "entities" at the Item ID level. These entities can correspond to attributes at a division or merchandise type level of a product taxonomy.

In some embodiments, within item reviews, individual words are categorized into the keyword entities based on an association between the keywords and entities (e.g., based on a sentiment analysis). This is performed using an Entity API that is called, which performs a sentiment analysis on review text. The sentiment analysis will, in a basic version, map particular words and positive or negative sentiments to entities. This is based on a mapping of particular words to the entities (e.g., a particular color to the attribute of color, a particular fabric to the attribute of fabric, etc.).

Additionally, aspect extraction may be performed. Aspect extraction is different from determination of attributes, for example directed to quality, value, catchphrases, etc. Both entities and aspects may be filterable features that are automatically generated for display in a user interface.

In some embodiments, a dictionary is generated of particular entities and aspects, and words that may fall within that entity/aspect category, as well as synonyms of the entity/aspect. A matching to the text of product reviews is performed to determine the presence or frequency of the particular entity for purposes of generating a filter. The top appearing entities within product reviews for a given item can then be displayed. Whether individual aspects are sufficiently important to become filters may be defined, at least in part, on contextual importance, a frequency or cooccurrence of the phrase, as well as its existence as a catchphrase, or overall positive sentiment.

In some embodiments, entity extraction can be performed using a supervised learning model. Training data can be generated based on item attributes. For example, a named entity recognition (NER) model may be used for entity extraction.

FIG. 1 illustrates an example e-commerce environment 100 for presenting an item with item review and keyword filters useable to filter the item reviews. The e-commerce environment 100 includes an e-commerce system 102, an admin computing device 104, a guest computing device 106 and a network 116. The e-commerce system 102 includes a keyword generator 108 and an e-commerce engine 110. The admin computing device 104 is shown with an admin user and operates an admin application 112. The guest computing device 106 is shown with a guest user and operates an e-commerce application 114.

The e-commerce system 120 operates to provide and operate backend services for the e-commerce application 114. In some embodiments, the e-commerce system 102 comprises one or more servers which are accessible by a plurality of computing devices to provide e-commerce content. In some embodiments, the e-commerce system 102 is managed by a single retailer. In other embodiments, the e-commerce system 102 provides an e-commerce platform which is used by various retailers and vendors. The e-commerce system 102 operates with other systems to, for example, process payments and deliver ordered items. An example of the e-commerce system 102 is illustrated and described in reference to FIG. 2.

In some embodiments, the e-commerce system 102 provides a webpage for selecting an item in a catalog and user-interfaces presenting various reviews for a particular item. These reviews can be filtered with entities. These entities correspond keywords including item attributes and/or aspects of the review. The keyword generator 108 operates to generate entities. In many embodiments, the keyword generator 108 automatically generates entities for an item or group of items (e.g., items of a same category). In some embodiments, the automatically generated entities are curated by an admin user. For example, the admin user can curate the entities on the admin computing device 104 via the admin application 112. One method 400 for generating keywords is illustrated and described in FIG. 4. Further examples of the keyword generator 108 are described herein. For example, an example keyword generator 302 is illustrated and described in reference to FIG. 3.

The e-commerce engine 110 performs the backend logic for the e-commerce application. For example, the e-commerce engine 110 can perform the logic for searching and recommending items, performing backend checkout and delivery procedures, etc. The e-commerce engine 110 may further track users accounts and user interactions with different webpages. The e-commerce engine 110 operates to provide filterable item reviews based on the entities generated by the keyword generator 108.

The admin computing device 104 operates an admin application 112. The admin computing device can be a variety of computing devices, such as laptops, desktops, mobile computing devices, etc. In some embodiments, the admin application 112 is used to perform various administrative functions of the e-commerce system 102. In some embodiments, the admin application 112 allows the admin user to curate and otherwise modify the entities generated by the keyword generator 108. For example, an admin user may wish to manage the entity name, one of the attributes, and/or one of the attribute values. An admin may also wish to curate or create a deny list of terms which should not be used as entities, attributes, attribute values, or aspects.

The guest computing device 106 operates an e-commerce application 114. The guest computing device can be a variety of computing devices, such as laptops, desktops, mobile computing devices, etc. The e-commerce application 114 can be a web application accessed via a browser or enable via an application (e.g., mobile application). The e-commerce application 114 allows a guest to view a catalog of items each including item reviews, filter the item reviews, and initiate and complete a checkout process for the item. Examples showing the user interface for filtering item reviews are illustrated and described in reference to FIGS. 10 and 11.

The network 116 is a data communication network that facilitates communication between the e-commerce system and various computing devices, such as the admin computing device 104 and the guest computing device 106. In some embodiments, the network 116 is a public network, such as the Internet. The network 116 can also include a cellular network.

Figure 2:
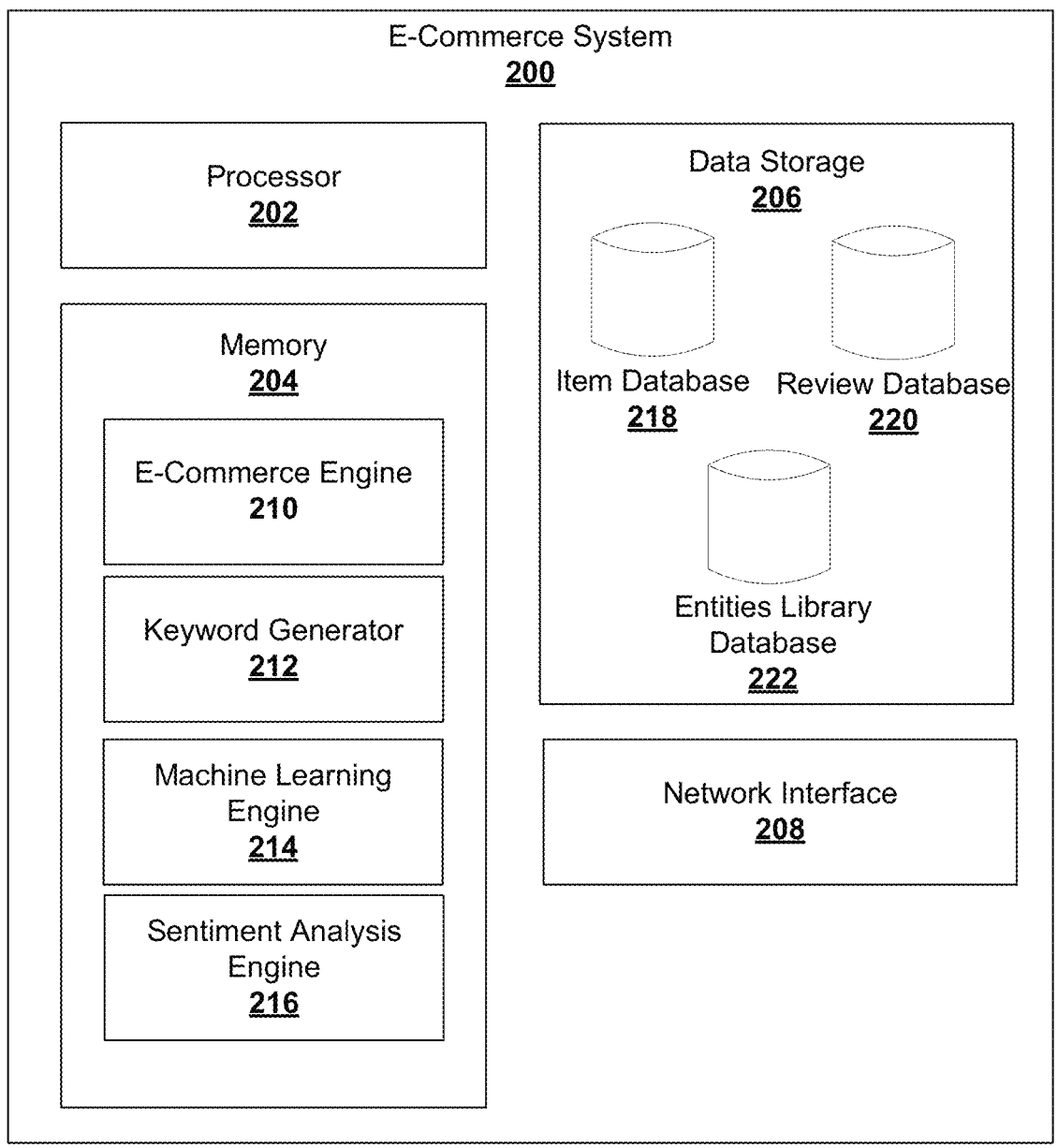
FIG. 2 illustrates an example e-commerce system, in accordance with some embodiments of the present disclosure.

FIG. 2 illustrates an example e-commerce system 200. The example e-commerce system 200 is another example of the e-commerce system 102 illustrated in FIG. 1. The e-commerce system 200 includes a processor 202, a memory 204, data storage 206, and a network interface 208.

The e-commerce system 200 can include one or more servers, which can be redundant and located in different geographic locations to provide the e-commerce services. One or more servers may include specialized components to complete specialized services, e.g., a server specialized for data storage. In some embodiments, the e-commerce system 200 is part of a cloud computing system.

In the example shown, the e-commerce system 200 includes a processor 202. However, many embodiments include one or more processors at each of a plurality of computing servers. The processor 202 is in data communication with the memory 204, the data storage 206 and the network interface 208. The processor executes instructions stored on the memory 204 to perform many of features and method disclosed herein.

The memory 204 can include RAM (Random Access Memory) and ROM (Read-Only Memory). An input/output system that contains the basic routines that help to transfer information between elements within the e-commerce system 200.

The data storage 206 is associated with computer-readable data storage media providing non-volatile, non-transitory storage for the media delivery system. In the embodiments, shown storage for an item database 218, a review database 220, and an entities library database 222 is accessible via the data storage 206. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which is accessible to the e-commerce system 200.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the e-commerce system 200.

The item database 218 stores information for a plurality of items which are for sale on the e-commerce application. Some examples of the information which can be stored at the item database 218 includes: item names, item prices, item types, item categories, retail division for items, item sub categories, inventory information, etc. Each item may also include a reference to one or more item reviews for the item stored at the review database 220. Other information related to the items can also be stored at the item database 218.

The review database 220 store a plurality of item reviews submitted by guests and sourced from brand websites for a plurality of items. In some embodiments, item reviews can include descriptive text of a review submitted by a user and a rating. In some embodiments, each item review includes a time the review was posted and/or a time the review was last modified. Other information related to item reviews can be stored at the review database 220. Once an entity is matched with a review the association between the entity and the review is stored in the review database 220.

The entities library database 222 stores a plurality of entity library entries. The entity library entry can include an entity name and/or ID, a plurality of attributes for the entity and for each attribute a plurality of attribute values. The entities library database 222 can be built using the method describe herein for extracting entities, attributes, and attribute values. An example structure 600 for entity entry in the entities library database 222 is illustrated and described in reference to FIG. 6.

In some embodiments, the entities library database 222 stores the output form the keyword generator 212. Including an associating between an entity and an item review and/or an association between an entity and a review. In some embodiments, the entities library database 222 is configured to provide entities at an item level and/or at a review level. In some embodiments, the entities or ranking of entities at a review level and or item level are updated periodically. For example, at the item level each item will have a set of entities which are included or might be included in the set of reviews. These entities are displayed to a user for selection. At the review level at least some of the reviews will include entities assigned to the review, which may be updated as entities associated with the item change.

According to various embodiments of the invention, the e-commerce system 200 may operate in a networked environment using logical connections to remote network devices via the network interface 208.

As mentioned briefly above, the data storage 206 and the memory 204 of the e-commerce system can store software instructions and data. The software instructions include an operating system suitable for a server or cloud system controlling the operation of the e-commerce system 200. The memory 204 can also store instructions, which are loaded from the data storage 206. The memory 204 can also store software instructions, that when executed by the processor 202, cause one or more of the systems, devices, or components described herein to provide functionality described herein. For example, the memory 204 can store software instructions for an e-commerce engine 210, a keyword generator 212, a machine learning engine 214, and a sentiment analysis engine 216.

The e-commerce engine 210 performs the logic for the e-commerce system 200. For example, the e-commerce engine 210 can perform the logic for providing web services to guests using an e-commerce application associated with the e-commerce system 200. The e-commerce engine 210 may further track users accounts and user interactions with different webpages. The e-commerce engine 210 operates to provide filterable item reviews based on the entities generated by the keyword generator 212.

Figure 3:
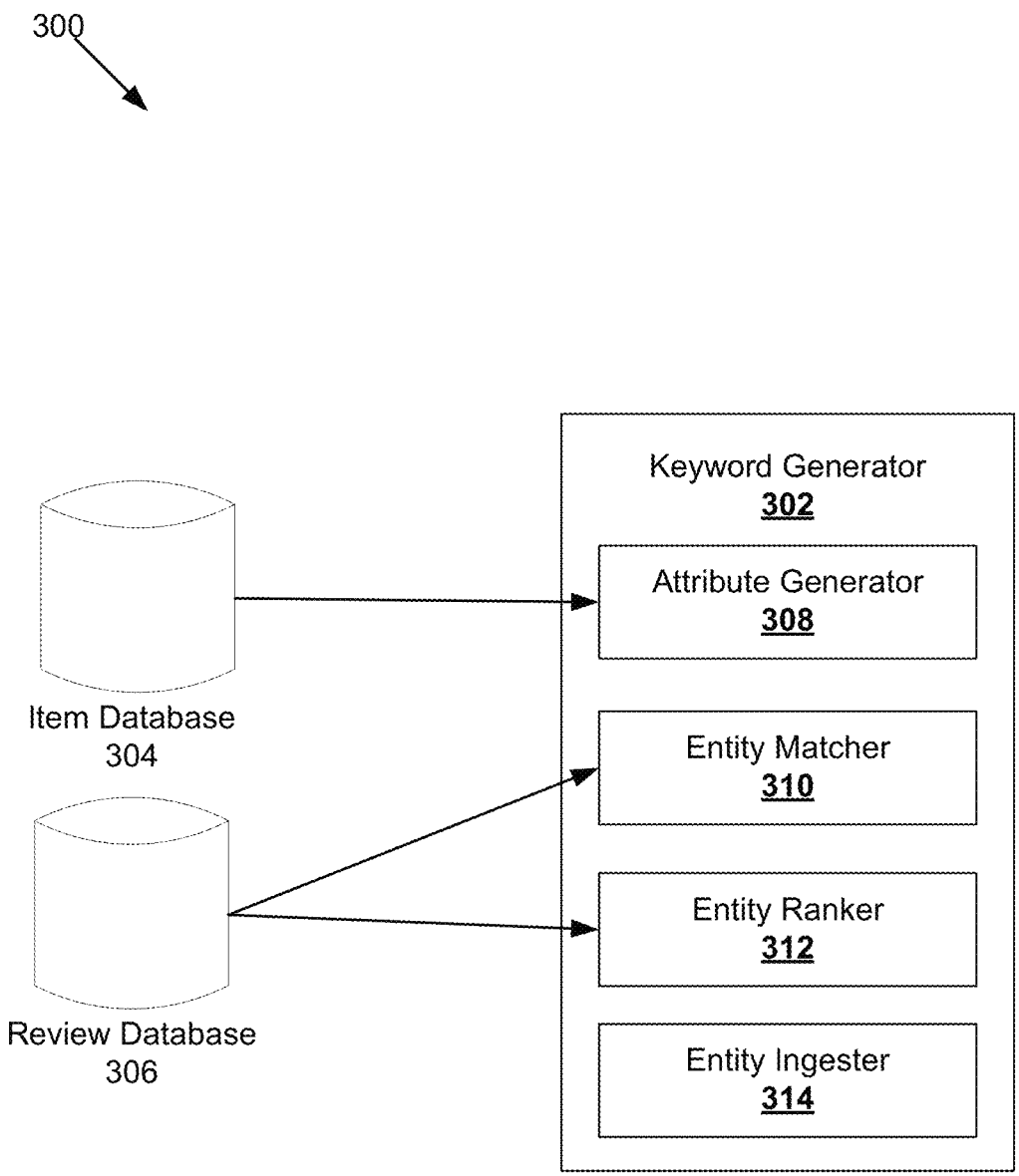
FIG. 3 illustrates an example keyword generator in data communication with an item database and a review database, in accordance with some embodiments of the present disclosure.

The keyword generator 212 operates to generate entities for items and reviews. In many embodiments, the keyword generator 212 automatically generates entities for an item or group of items (e.g., items of a same category). Example methods and systems for generating entities are described herein. For example, an example keyword generator 302 is illustrated in FIG. 3 and an example method 400 for generating keywords is illustrated and described in FIG. 4. Further example systems and methods are also described herein.

The machine learning engine 214 is used to execute and train machine learning models for performing some of the features describe herein. For example, a machine learning model can be trained on item data inputs and item review inputs to extract entities. In some embodiments, these models are continuously trained based on recorded user inputs selecting entities to filter reviews by. In some embodiments, machine learning is used to refine entities extracted via other methods. In some embodiments, models for natural language processing are trained and executed as part of the machine learning engine 214. In some embodiments, one or more machine learning models is used by the sentiment analysis engine 216 to predict a sentiment of a review.

The sentiment analysis engine 216 determines a sentiment for a review. The sentiment analysis engine 216 retrieves one or more review form the review database 220 and analyzes the text to determine a sentiment. For example, the sentiment may determine the guest views the product positively or negatively. In some embodiments, the sentiment analysis engine 216 determines the sentiment for the review overall. In some embodiments, the sentiment analysis engine determines a sentiment for each entity in the review. For example, a guest may have a positive sentiment for a first entity of the product but a negative sentiment for a second entity. In these embodiments, the determine sentiment can is then associated with the corresponding entity in the context of the review. In some embodiments, the sentiment analysis engine 216 uses one or more machine learning models to predict a sentiment or a review and/or entity of the review.

FIG. 3 illustrates an example keyword generator in data communication with an item database 304 and a review database 306. The keyword generator 302 is another example of the example keyword generator 108 illustrated in FIG. 1, and the example keyword generator 212 illustrated in FIG. 2. The item database 304 is another example of the item database 218 illustrated in FIG. 2. The review database 306 is another example of the review database 220 illustrated in FIG. 2. The keyword generator 302 includes an attribute generator 308, an entity matcher 310, an entity ranker 312, and an entity ingester 314.

In some embodiments, the attribute generator 308 extracts attributes for an item or a category of items based on item data and/or data for a category of items retrieved from the item database 218. In some embodiments, the attribute generator retrieves a set number of items in a given category (e.g., shoes) or a given division (e.g., men's clothing). For example, the attribute generator may retrieve item data for the top 25 items in a category. The item data is processed by the attribute generator 308 to determine a set of attributes. In some embodiments, the attributes are predetermined based on the item category. For example, for clothing attributes predetermined could include size, gender, color, type, etc. Additionally, in some embodiments, the attribute generator can determine attributes at an item level, an item type level, and/or at a division level. For example, for clothing, attributes can be determined for a specific article of clothing, attributes for a type of clothing (e.g., shirts), a division (e.g., women's clothing), or a general division (e.g., all clothing).

In some embodiments, the item data includes item reviews submitted by guests for a corresponding item. In these embodiments, the reviews may be retrieved from the review database 306. In some embodiments, the data is processed to identify terms (sometimes referred to as tokens) and a frequency of the terms are calculated. The terms with the highest frequency can be selected as attributes. For example, the terms with the top 50 frequency can be selected and extracted. In some embodiments, a natural language processing technique is used to identify terms which do not convey useful information (e.g., the word "the") to eliminate such words from being calculated. In some embodiments algorithms are used to specifically identify descriptive words. In some examples, a list of words to ignore is provided. These can be words that are known to not be descriptive of an item or item category (e.g., a brand name). In some embodiments, a machine learning algorithm is trained to identify attributes based on a set of item data. In some embodiments, a human can curate the extracted attributes. In some embodiments, the attribute generator 308 also determines different attribute values. For example, attribute values for size can include large, big, small, lose, etc. Additionally, multi-token attributes can also be extracted (e.g., "pants length").

In some embodiments, further attributes or attribute values are determined by retrieving synonyms for the identified terms. In some embodiments, synonyms are identified using a thesaurus application or by web scraping a thesaurus web application.

The entity matcher 310 matches the list of attributes compiled by the attribute generator 308 with item reviews for one or more particular items. The item reviews are retrieved form the review database 306. Matching the reviews with an attribute includes determining if an item review includes a term which is a match of the attribute or attribute value. In some embodiments, a machine learning model can be used to verify that correct matching occurs. For example, a machine learning model may be trained to perform more complex analysis of text. In one example, a brand may include a color which is not descriptive of the product. A machine learning model can be trained to identify brands and not match reviews which are referring to the brand instead of the descriptive term. In other embodiments, the matching can be curated by an admin user.

In some embodiments, the matching is based on a set of rules. For example, the rule may define which entities are being search for based on the item or review. In some embodiments, the attribute may be a multi-token attribute. In these embodiments the rules may further define whether a partial or full match is required. A partial match would include a match with all tokens but not in the same sequential order or some of the tokens but not all of the tokens.

The entity ranker 312 ranks the entities. In some embodiments, this ranking is done to select at least one entity to associate with the review. In the entities can be ranked on the frequency the entity is matched in related reviews. In some embodiments, the related reviews are weighted based on when the review was posted. In some embodiments, this weighting is done to bias the entities toward entities which are identified in more recent reviews. In some embodiments, reviews can be weighted based on when the review was posted based on other factors instead of or in addition to the recency of the review. For example, reviews which were posted during a marketing campaign can be emphasized or deemphasized based different business goals. In some of these embodiments, an admin user can apply a range of dates to weight and a weight value to apply to reviews falling within those dates. Weights can also be applied to a review based on the sentiment of the review. For example, reviews with a strong negative or positive sentiment may be emphasized or deemphasized because such reviews may include more or less representative attribute terms for the item.

The entity ingester 314 ingest the entities output from the entity ranker 312. In some embodiments, the ranked entities are output from the entity ingester 314. In some embodiments, the entity ingester 314 outputs entities at a review level (e.g., entities assigned to a particular review) and an item level (entities assigned to a particular item). The output entities are usable by an e-commerce application to filter reviews based on the matched entities to each review. In some embodiments, the entity ingester 314 operates periodically. For example, the entity ingester 314 may post updated entities each hour, day, week, etc. In some embodiments, the entities are posted to a Kafka® topic which is ingested to a database usable by an e-commerce engine and e-commerce application. In some embodiments, the Kafka® topic is ingested into a specialized database, such as a MongoDB®.

Figure 4:
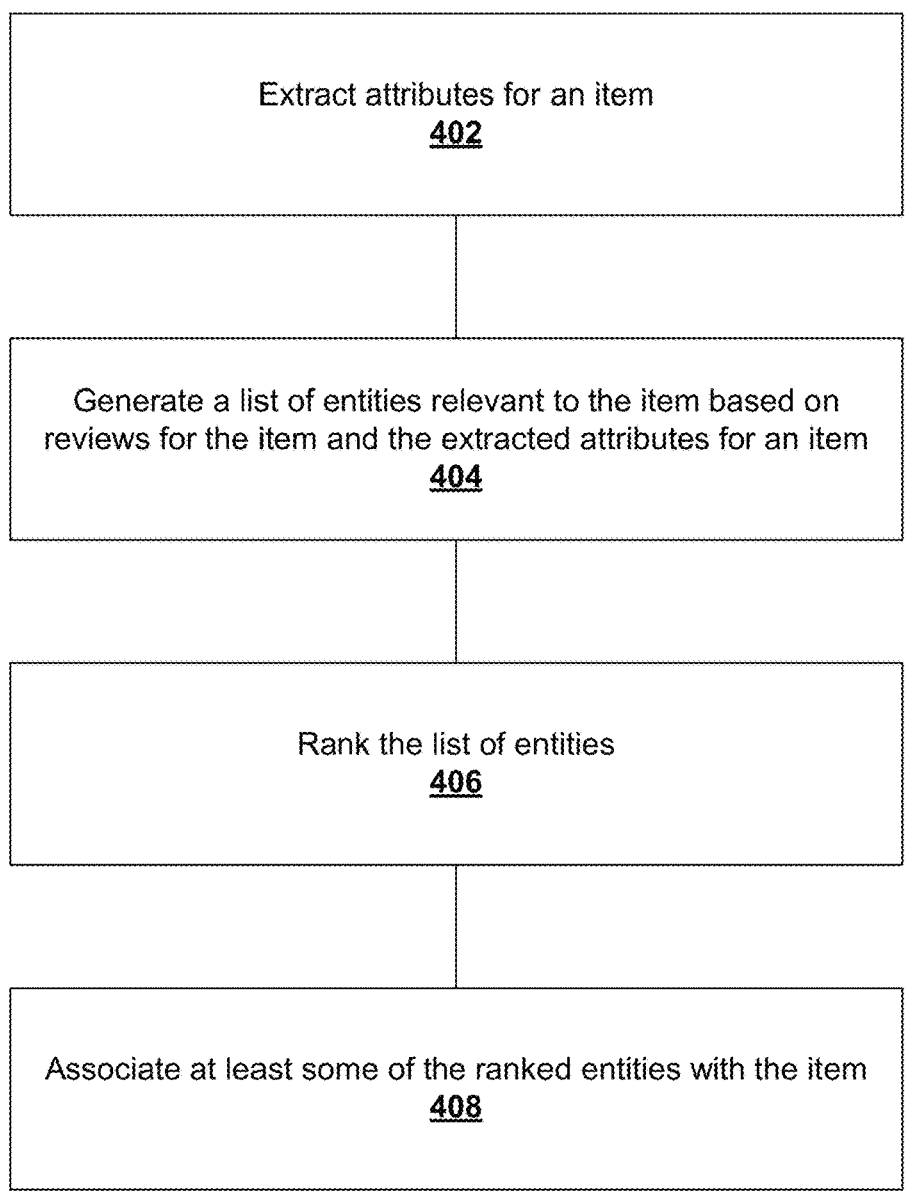
FIG. 4 illustrates an example method for generating entities for filtering item reviews, in accordance with some embodiments of the present disclosure.

FIG. 4 illustrates an example method 400 for generating entities for filtering item reviews. In some examples, the method 400 can be performed on the keyword generator illustrated in FIGS. 1-3. The method 400 includes the operations 402, 404, 406, and 408.

In general the method 400 is used to extract entities. In some embodiments, the entity extraction process seeks to locate and classify entities in text into predetermined categories.

The operation 402 extracts attributes for an item. In some embodiments, the attributes are extracted from the item data or from other items of a similar type or division. For example, attributes for a shirt can be extracted from item data for other shirts and/or item data from other articles of clothing. In some embodiments the attributes are extracted using a machine learning algorithm. For example, a model may receive inputs which include item data and outputs a set of attribute based on the item dat. In some embodiments, the attributes are predefined base on the type of item. For example, shoes may have a predefined set of attributes (e.g., size, color, material). In some embodiments, attributes can be extracted from filter used to search for an item. In some examples, natural language processing techniques are used to extract attributes. In some embodiments, attribute values are also extracted. For example, if the attribute is size, then attribute values would include small, medium, large, big, baggy, tight, etc. In some embodiments, the extracted attributes and/or attribute values are further supplemented using synonyms. In some embodiments, attributes are extracted using the attribute generator 308 illustrated and described in reference to FIG. 3. An example method 500 for extracting attributes for an item is illustrated and described in reference to FIG. 5. The extracted attributes can be grouped and mapped to an extracted entity.

The operation 404 generates a list of entities relevant to an item and/or review based on the item review and the extracted attributes for an item. In some embodiments, the list of entities are generated by extracting keywords from a set of reviews. In some embodiments, entity entries stored in an entity library are used to determine a set of entities relevant to a review. For example, if an entity name, attribute name, or attribute value matches a term in are view the entity is determined to be relevant to the review. Similarly, the reviews for an item are used to extract entities which might be relevant to the item. In some embodiments, reviews related to the item are also reviewed to extract entity candidates. For example, reviews of items of the same type and/or items in a same department of the retailer.

The operation 406 ranks the list of entities. In some embodiments, the entities are ranked based on a frequency of terms related to the entity are identified in the reviews for the item. In some embodiments, reviews of items of the same type or items found in the same department are also reviewed to calculate a frequency. In some embodiments, the reviews are weighted based on when the review was posted. For example, terms will be weighted to bias the ranking towards terms in more recent reviews. In some embodiments, terms are weighted based on other factors.

The operation 408 associates at least some of the ranked entities with the item. In some embodiments the entities will include a set of attributes and a set of attribute values associated with the entity. In some embodiments, the predetermined number of the top ranked entities are selected and associated with the item. For example, the top ten entities can be selected. The associated entities are presented to a user viewing the reviews for the product. The user can filter the reviews by selecting one or more the associated entities. An example user interface for filtering reviews with the entities associated with an item is illustrated and described in reference to FIGS. 10 and 11.

Figure 5:
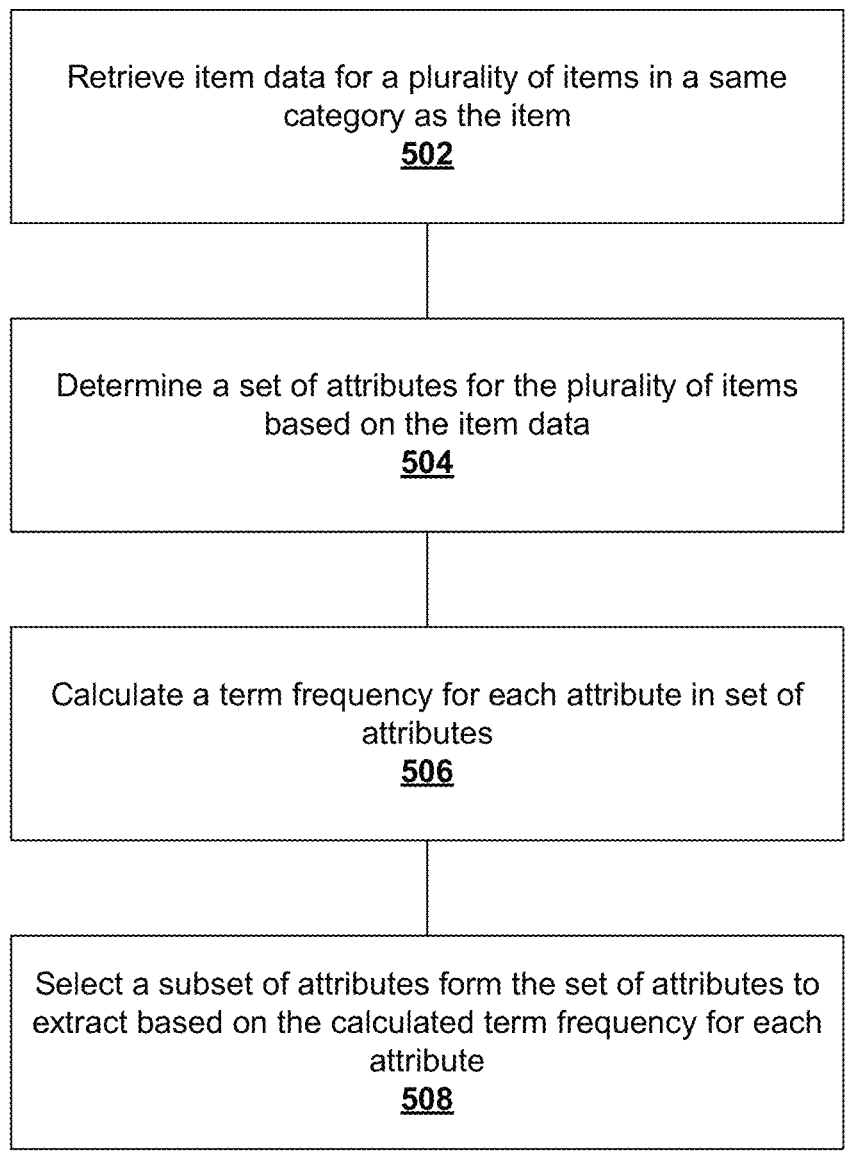
FIG. 5 illustrates an example method for extracting item attributes, in accordance with some embodiments of the present disclosure.

FIG. 5 illustrates an example method 500 for extracting item attributes. In some examples, the method 500 is performed as part of the operation 402 illustrated and described in reference to FIG. 4. The method 500 includes the operations 502, 504, 506, and 508.

The operation 502 retrieves item data for a plurality of items in a same category as the item. In some embodiments, the operation 502 will retrieve all items of the same type (e.g., all shoes) or in the same department (e.g., clothing). In some embodiments, the item data is retrieved from an item database. In some embodiments, reviews for the item can also be retrieved.

The operation 504 determines a set of attributes for the plurality of items based on the item data. In some embodiments a dictionary of keywords is used to extract attributes from the item data. In some embodiments, a machine learning model receives the item data and predicts a set of item attributes. In some embodiments, attributes are identified using a natural language processing technique. As describe above an admin user can further curate the set of attributes.

In some embodiments, the operation 506 calculates a term frequency for each attribute in the set of attributes. In some embodiments, the operation 506 processes a plurality of reviews associated with the items to calculate a frequency of attributes found in the text of the reviews. In some embodiments, each review is weighted to create a bias towards more recent reviews.

The operation 508 selects a subset of attributes from the set of attributes to extract based on the calculated term frequency for each term. In some embodiments, these attributes grouped and mapped to an extracted entity. In some embodiments, this mapping is defined in the entity library database illustrated and described in reference to FIG. 6. In some embodiments, the subset of attributes is a predetermined number of attributes based on the calculated frequency the attribute. For example, the subset of attributes may comprise the 50 attributes with the highest calculated frequency. Other methods can be used to determine the subset of attributes.

Figure 6:
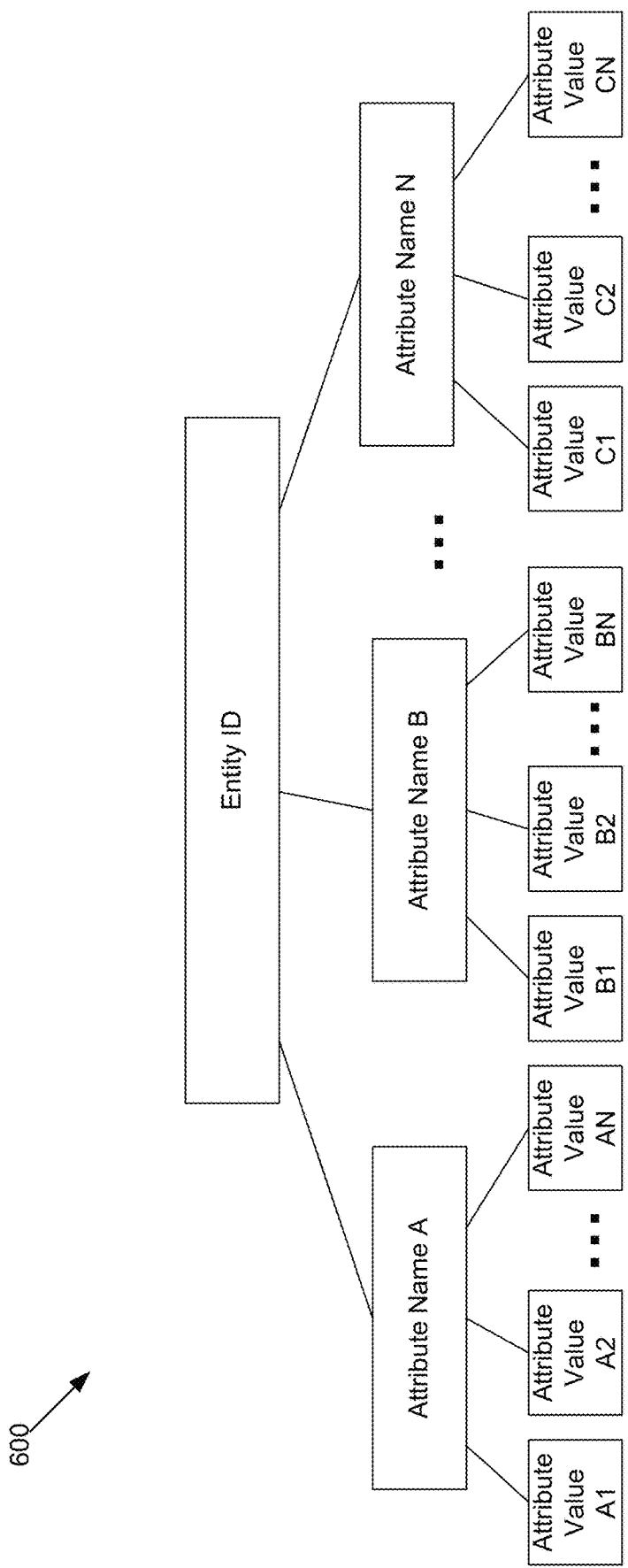
FIG. 6 illustrates an example structure for data stored in an entity library database, in accordance with some embodiments of the present disclosure.

FIG. 6 illustrates an example structure 600 for data stored in an entity library database. In some embodiments the entity library database is the entities library database 222 illustrated in FIG. 2. In the example shown, each entry includes an entity ID in some embodiments, the entity ID is an entity term or terms. For example, the entity ID could be "size", "color", "fit", "comfort", etc. The entity ID is associated with one or more attribute name. As shown, the attribute name A, attribute name B, . . . attribute name N. An attribute is an example term for the entity. For example, if the entity ID is "fit", an example attribute may be "size." In some embodiments, the entity ID and one of the attribute value may be the same. Each example attribute is associated with one or more attribute values. In the example where the attribute is size, the attribute value may be "small", "medium", "large", "big", "baggy", and "tight". The structure 600 is used to match entities with relevant review using methods and systems described herein. One example method 700 for matching an entity with an item review is illustrated and described in reference to FIG. 7.

Figure 7:
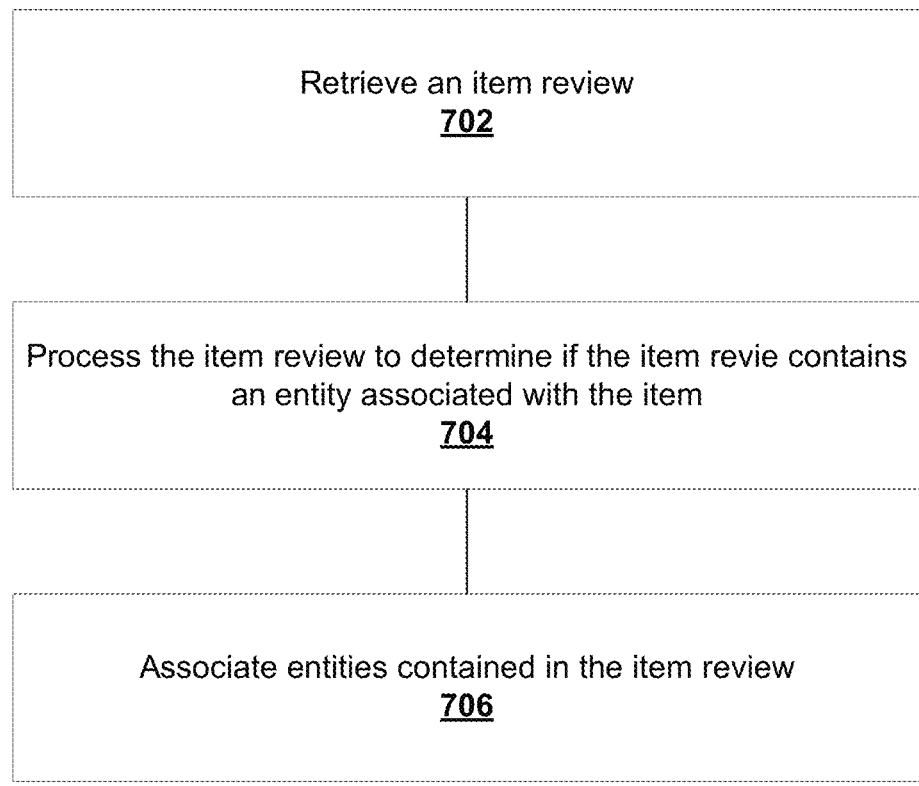
FIG. 7 illustrates an example method for matching an entity with an item review, in accordance with some embodiments of the present disclosure.

FIG. 7 illustrates an example method 700 for matching an entity with an item review. The method 700 includes the operations 702, 704, and 706. In some embodiments, the method 700 is performed for each item review associated with an item.

The operation 702 retrieves an item review. In some embodiments, the item review is retrieved from the review database.

The operation 704 processes the item review to determine if the item review contains an entity associated with the item. In some embodiments, the text of the item review is processed to determine if any terms match the entity name, any attribute names associated with the entity, or attribute values associated with one of the attribute names. In some embodiments, the attribute name is a multi-token attribute name. For example, the attribute "long pants." In these embodiments, a partial match may be determined as containing the entity. For example, a review with the term "long" will be determined a match. In other embodiments, a full match is required. In some embodiments, a rules engine is used to determine if the item review contains the entity. In some embodiments the rules are based on the item the reviews are associated with for features of the item. Additionally, in some embodiments, a machine learning model is used to process the review.

The operation 706 associates entities which are contained in the item review. The entities determined to be contained in the review are associated and stored in a database accessible to an e-commerce application. This allows the e-commerce application to hide reviews which do not match a filter selected by a guest.

Figure 8:
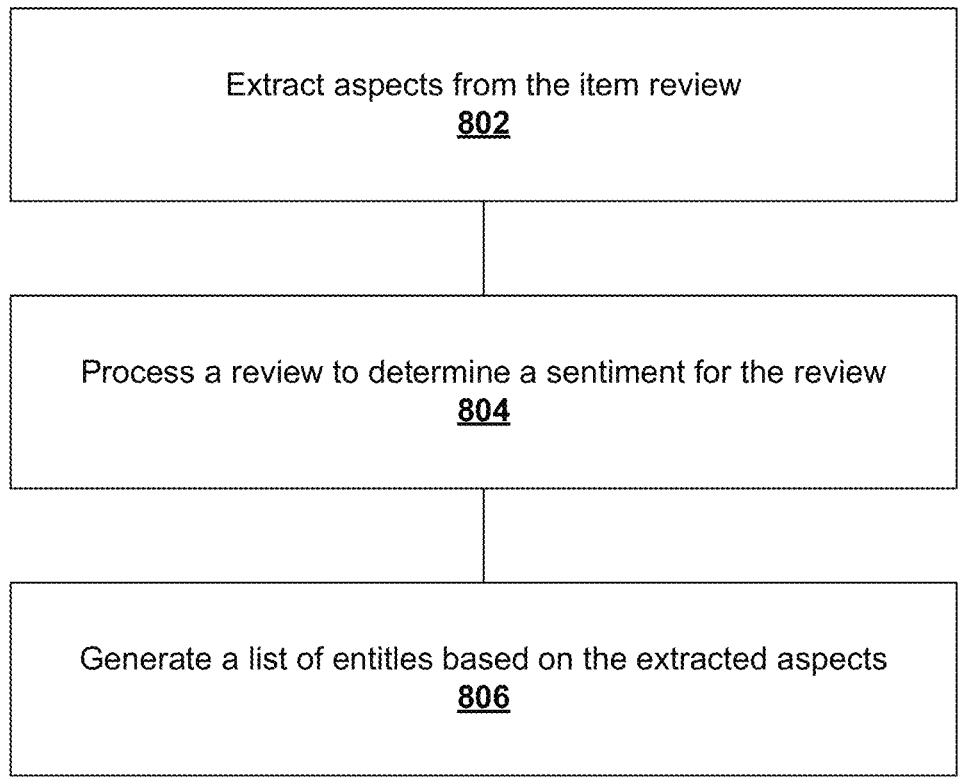
FIG. 8 illustrates an example method for extracting aspects from an item review, in accordance with some embodiments of the present disclosure.

FIG. 8 illustrates an example method 800 for extracting aspects from an item review. The method 800 includes the operations 802, 804, and 806. In some embodiments, attributes and aspects are extracted for an item and/or review. In other embodiments, just attributes or just aspects are extracted.

The operation 802 extracts aspects from an item review. Aspects include descriptions of quality, value, or catch phrase of an item. In some embodiments, aspects are extracted using similar methods used for extracting attributers. Including but not limited to natural language processing, machine learning, admin curation, A/B testing etc. In some embodiments, item marketing material is processed to extract aspects.

In some embodiments, the operation 804 processes a review to determine a sentiment for the review. In some embodiments, an entity is extracted which is related to a frequent sentiment detected in the item reviews. In some of these embodiments, the sentiment may be associated with a detected entity in a review. For example, if a review for chips says, "the chips taste good," the sentiment good is associated with the entity "taste." In some embodiments, a machine learning model is used to detect sentiment.

The operation 806 generates entities based on the extracted aspects. The entities for aspects can be calculated by analyzing a frequency of term associated with the aspect to rank the aspects and selecting the top aspects as entities. Other methods used for generating entities from attributes can also be used. For example, the aspects can be grouped and mapped to particular entities. For example, aspects can be grouped as positive, negative, or mixed.

FIG. 9 illustrates an example method 900 for testing entities with guests. The method 900 includes the operations 902, 904, 906, and 908. The method 900 outlines a method for A/B testing a set of entities. The results from the test can be used to further refine a set of entities for an item.

The operation 902 segments guest into a first group and a second group. For example, 100 guests can be selected for the first group of guests and another 100 can be selected for a second group of guests.

The operation 904 provide a review filter on a first set of entities to the first group of users and a second set of entities to the second group of users. The first group and second group are presented a set of entities which include at least one different entity. The operation 906 records the selection of the review filter for the first group of users and the second group of users. These selections are analyzed to determine which entities are frequently selected and which one entities are not selected. Additionally, the combination of entities and ordering of entities can be tested.

The operation 908 updates the entities for the item based on the analysis of the recorded selections. For example, if one entity is rarely selected and another entity that was initially ranked lower is frequently selected, then the list of entities can be updated based on the guest behavior. Similar recording of guest interactions can be used to continuously update and/or train the keyword generator to include entities which are useful to guests.

Figure 10:
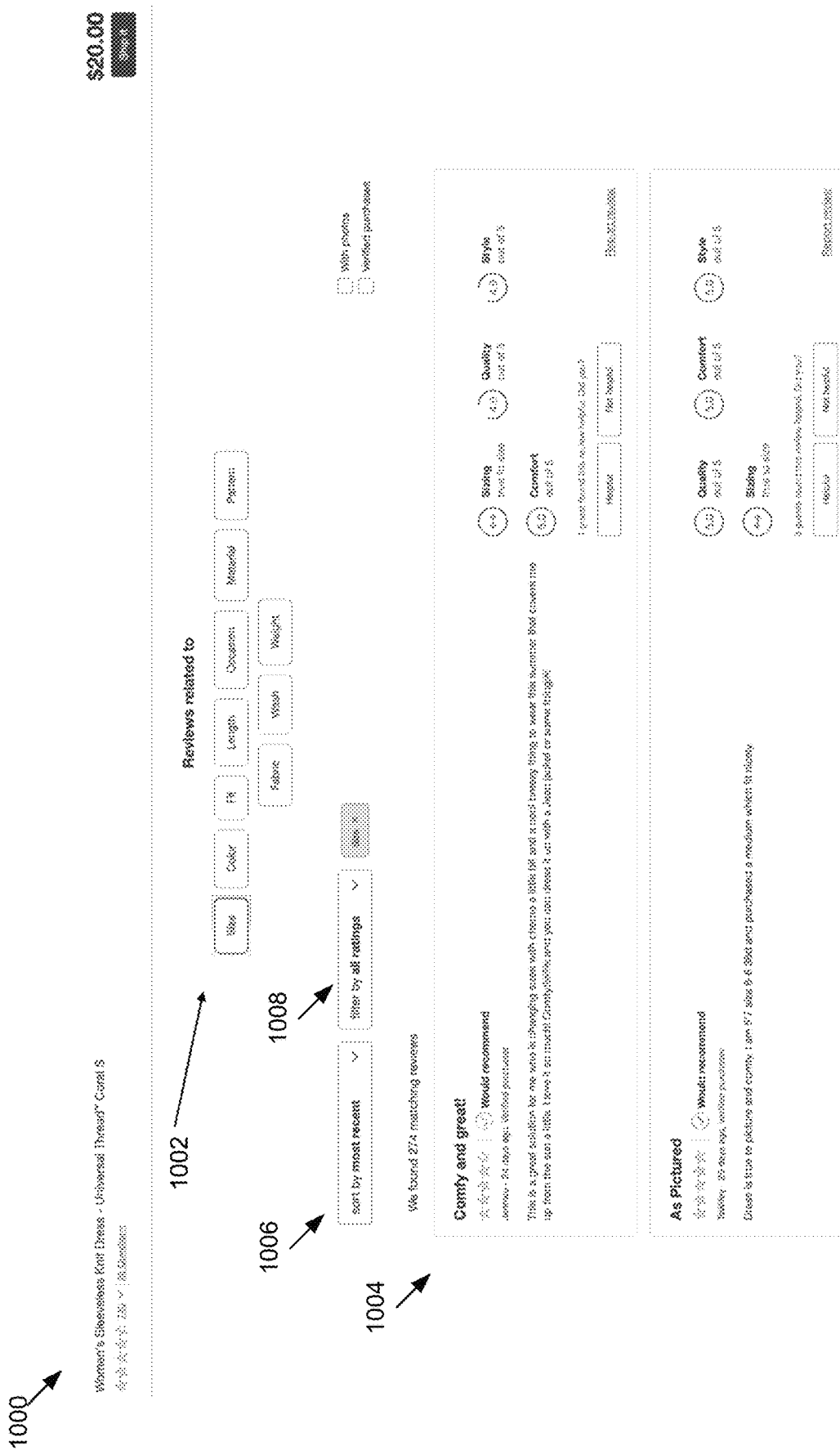
FIG. 10 illustrates an example user interface for filtering item reviews, in accordance with some embodiments of the present disclosure.

FIG. 10 illustrates an example user interface 1000 for filtering item reviews. A guest can select an entity at the entity filter inputs 1002 to filter a plurality of reviews and display a set of related reviews at 1004. In some embodiments, a guest can select a single entity, which is automatically toggled off when a user selects a second entity. In other embodiments, a user can select multiple entities to filter on and a selection of a selected entity toggle the entity between selected/not selected. Also shown is a sort input 1006 to sort the reviews and a rating filter input 1008 for filtering reviews by a review rating. The user interface 1000 is displayed on a guest device as part of an e-commerce application. For example, the guest computing device 106 and the e-commerce application 114 illustrated and described in reference to FIG. 1. Another example of the user interface 1000 is illustrated and described in reference to FIG. 11.

Figure 11:
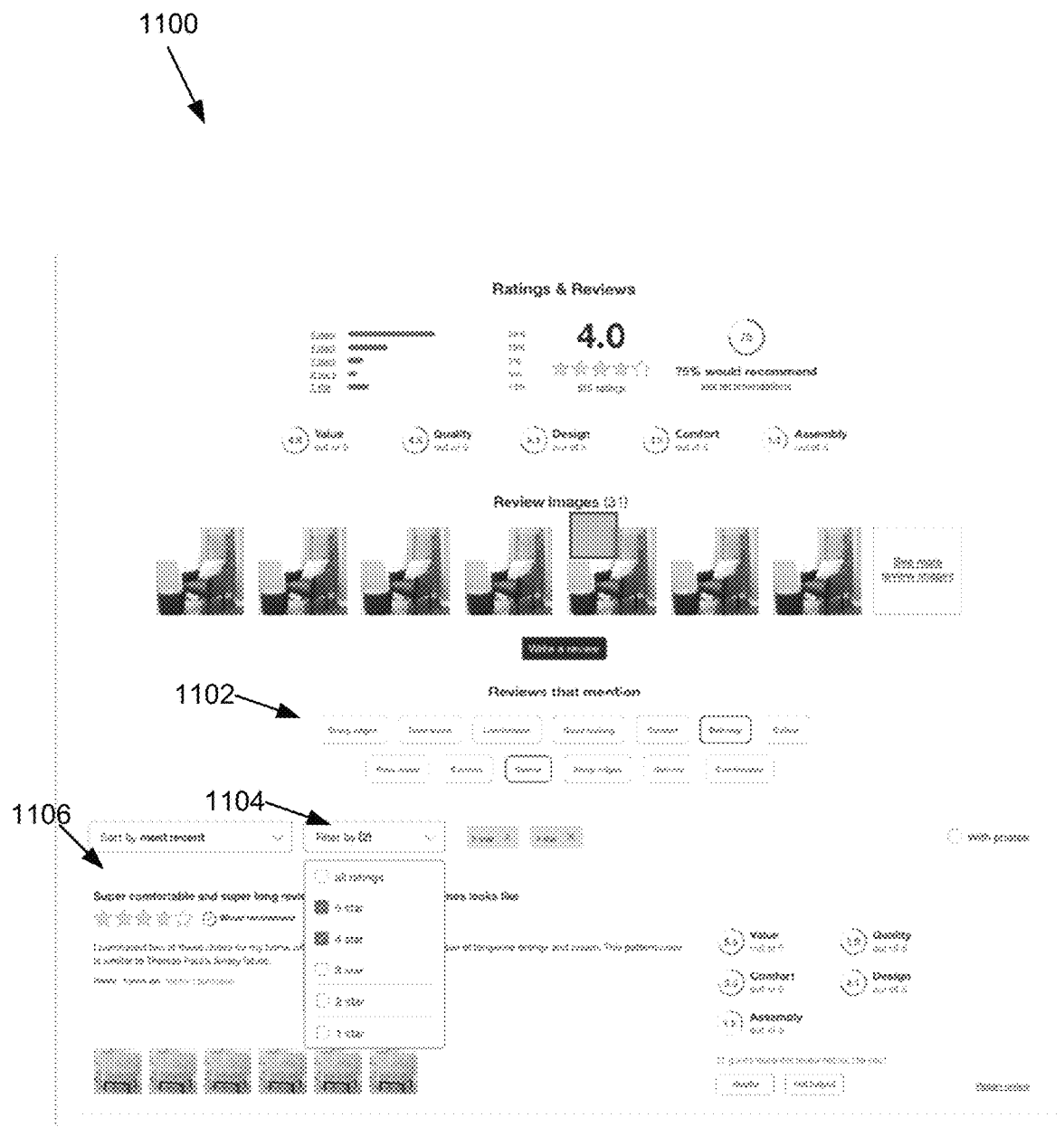
FIG. 11 illustrates an example user interface for filtering item reviews, in accordance with some embodiments of the present disclosure.

FIG. 11 illustrates an example user interface 1100 for filtering item reviews. The user interface 1100 is another example of the user interface 1000 illustrated and described in reference to FIG. 11. The user interface 1100 is shown with multiple entities selected at the entity filter inputs 1102. Also shown is a rating filter input 1104 shown with section for reviews with "5 stars" and "4 stars" ratings. The reviews shown at 1106 are the reviews which meet the selected entities and ratings. The user interface 1100 is displayed on a guest device as part of an e-commerce application. For example, the guest computing device 106 and the e-commerce application 114 illustrated and described in reference to FIG. 1.

Referring to FIGS. 1-11 generally, the method and systems for generating entities provides a number of advantages over existing systems. For example, the presentation of unique filter types on a user interface to improve a guest's ability to access relevant information provides significant advantages as to operability of a retail website. Additionally, automating the generation of entities allows the system to continually update entities based on, for example, new user reviews, recorded interactions, and/or new and updated products. Many other advantages are apparent from the present disclosure.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for generating entities for filtering item reviews, the method comprising:
   using a machine learning algorithm, extracting attributes for an item associated with a set of item reviews from other items of a similar type or division;
   using a machine learning model, generating a list of entities relevant to the item based on the set of item reviews and the extracted attributes for the item;
   ranking the list of entities based on a frequency of terms related to each entity in the set of item reviews;
   selecting a predetermined number of entities from the list of entities based on the ranking;
   associating the predetermined number of entities with the item;
   simultaneously displaying a plurality of selectable entity filter inputs and a selectable entity rating input on a user interface, wherein each of the plurality of selectable entity filter inputs corresponds to each of the predetermined number of entities and the selectable entity rating input corresponds to a list of rating values associated with the set of item reviews, wherein the plurality of selectable entity filter inputs are continuously updated as the set of item reviews is updated with new item reviews;
   receiving an entity selection of one or more selectable entity filter inputs of the plurality of selectable entity filter inputs;
   receiving a rating selection of one or more of the rating values from the list of rating values; and
   in response to receiving the entity selection and the rating selection, filtering the set of item reviews to only display item reviews that correspond to the entity selection and the rating selection.

2. The method of claim 1, wherein for each entity of the at least one entity:
   determining if each item review in the set of item reviews contains the entity; and
   associating the item review with the entity if the item review is determined to contain the entity.

3. The method of claim 2, determining if each item review in the set of item reviews contains the entity further comprises:
   determining if the item review contains a term which is a match to an attribute associated with the entity.

4. The method of claim 3, wherein the item review is determined to contain a matching term when the term associated with the entity is a multi-token term the item review contains a partial match.

5. The method of claim 1, wherein extracting the attributes further comprises:
   retrieving item data for a plurality of items in a same category as the item;
   determining a set of attributes for the plurality of items based on the item data;
   calculating a term frequency for each attribute in the set of attributes; and
   selecting a subset of attributes form the set of attributes to extract based on the calculated term frequencies for the attributes.

6. The method of claim 1, further comprising:
   building an entity library storing a plurality of entities, wherein each entry includes an entity ID and one or more attributes, each of the one or more attributes including one or more attribute values.

7. The method of claim 1, further comprising:
   automatically generating attributes which are synonyms to the extracted attributes.

8. The method of claim 1, further comprising:
   extracting aspects from the set of item reviews, the aspect describing one of: a quality, value, and catchphrase of the item;
   wherein generating the list of entities relevant to the item is further based on the extracted aspects.

9. The method of claim 8, wherein extracting the aspects form the set of item reviews further comprises:
   performing sentiment analysis on each of item review in the set of item reviews using a machine learning model.

10. The method of claim 1, wherein ranking the list of entities is further based on a weight assigned to each review based on when the review was posted.

11. The method of claim 1, wherein ranking the list of entities is further based on a frequency of related terms in the item reviews for related items.

12. The method of claim 1, further comprising:
    segmenting guests into a first group and second group;
    providing a review filter on a first set of entities from the at least one entity to the first group of guests and a second set of entities from the at least one entity to the second group of guests;
    recording selections of the review filter for the first group of guests and the second group of guests; and
    updating the ranked list of entities based on the recorded selections.

13. An e-commerce system comprising:
    an item database;
    a review database;
    at least one processor;
    at least one memory device storing instructions which, when executed by the at least one processor, cause the e-commerce system to:
      retrieve item data for a plurality of items from the item database;
      using a machine learning algorithm, extract attributes for each of the plurality of items from other items of a similar type or division based on the item data;
      for each item of the plurality of items:
        retrieve one or more item reviews associated with the item from the review database;
        for each item review of the one or more item reviews, using a machine learning model, generate a list of entities relevant to the item review based on the item review and the extracted attributes for the item;
        rank the list of entities based on a frequency of terms related to each entity in the one or more item reviews;
        select a predetermined number of entities from the list of entities based on the ranking;
        associate the predetermined number of entities with the item;
        simultaneously display a plurality of selectable entity filter inputs and a selectable entity rating input on a user interface, wherein each of the plurality of selectable entity filter inputs corresponds to each of the predetermined number of entities and the selectable entity rating input corresponds to a list of rating values associated with the set of item reviews, wherein the plurality of selectable entity filter inputs are continuously updated as the set of item reviews is updated with new item reviews;

receive an entity selection of one or more selectable entity filter inputs of the plurality of selectable entity filter inputs;

receive a rating selection of one or more of the rating values from the list of rating values; and in response to receiving the entity selection and the rating selection, filter the set of item reviews to only display item reviews that correspond to the entity selection and the rating selection.

14. The e-commerce system of claim 13, further comprising:

an admin application configured to receive selections curating the extracted attributes, entities, and associations between the entities and the plurality of items.

15. The e-commerce system of claim 13, further comprising:

an entities library database storing a plurality of entity entries, each entry including:
an entity ID; and
one or more attributes, the one or more attributes including one or more attribute values.

16. The e-commerce system of claim 15, wherein the entity entries are used to determine if a review contains the associated entity.

17. The e-commerce system of claim 13, further comprising:

a matched entities database storing, for each the plurality of items, the associated entities, and a corresponding set of reviews for the item, the corresponding set of reviews being mapped to the associated entities contained in a particular item review.

18. The e-commerce system of claim 17, wherein the matched entities database is configured to provide entity information at an item level and a review level.

* * * * *